United States Patent Office 3,518,261
Patented June 30, 1970

3,518,261
PROCESS OF PREPARING PHOSPHORUS ESTERS
Thanh-Thuong Nguyen, Arcueil, and Daniel Demozay, Villeurbanne, France, assignors to Pechiney-Progil-Societe pour le Developpement et la Vente de Specialites Chimiques, Paris, France
No Drawing. Filed June 15, 1966, Ser. No. 557,621
Claims priority, application France, June 18, 1965, 21,372
Int. Cl. C07d 87/46
U.S. Cl. 260—247.1                          3 Claims

ABSTRACT OF THE DISCLOSURE

Trithio- and tetrathio-phosphoric esters having the general formula $$\begin{array}{c} R'S \\ \phantom{R'S}\diagdown \\ \phantom{R'S}\phantom{\diagdown}\underset{\displaystyle R''S\diagup}{\overset{\displaystyle Y}{\underset{\displaystyle \|}{P}}}-S-R \end{array}$$

prepared by the reaction of the halide of the R group with the tetramethyl ammonium salt of disubstituted derivatives of trithio-phosphoric or tetrathio-phosphoric acids in the presence of a solvent.

---

This invention relates to new organic derivatives of phosphorus which find new and novel use and antiparasitics.

The invention also relates to a process for the preparation of various new trithio- and tetrathio-phosphoric esters having the general formula $$\begin{array}{c} R' \\ \phantom{R'}\diagdown \\ \phantom{R'}\phantom{\diagdown}\underset{\displaystyle R''S\diagup}{\overset{\displaystyle Y}{\underset{\displaystyle \|}{P}}}-S-R \end{array}$$

in which R' and R'' represent alkyl radicals having from 1 to 5 carbon atoms, such as methyl, ethyl, propyl, isopropyl, butyl, isobutyl, pentyl and isopentyl, Y is oxygen or sulphur and R represents $$-CH_2-\!\!\!\!\bigcirc\!\!\!\!-M$$

in which M is one or more of the following groups including a halogen such as chlorine, bromine, iodine and fluorine, alkyl radicals such as methyl, ethyl, propyl, butyl, hexyl, octyl and the like, and such alkyl groups substituted by a halogen such as methyl chloride, ethylene dichloride, ethylene bromide and the like, nitro, cyano, alkoxy or thioalkyl groups in which the alkyl component is of the type previously described or —A-COOR$_1$, in which A represents a methylene or ethylene radical, which may be unsubstituted or substituted by alkyl, aryl, or carboxyalkyl groups such as methyl, ethyl, propyl, octyl, phenyl, tolyl, benzyl, naphthyl and the like, R$_1$ represents an alkyl radical containing from 1 to 5 carbon atoms of the types previously described or $$-CH_2-CO-N\!\!\begin{array}{c}\diagup R_2 \\ \diagdown R_3\end{array}$$

$$\begin{array}{c} R'S \\ \phantom{R'S}\diagdown \\ \phantom{R'S}\phantom{\diagdown}\underset{\displaystyle R''S\diagup}{\overset{\displaystyle Y}{\underset{\displaystyle \|}{P}}}-S-R \end{array}$$

in which R$_2$ and R$_3$ are the same or different groups and in which R$_2$ and/or R$_3$ is hydrogen, saturated alkyl radicals containing from 1 to 5 carbon atoms of the types previously described or phenyl radicals and in which the alkyl and phenyl radicals may be unsubstituted or substituted by a halogen such as chlorine, bromine, fluorine and iodine, and in which, in addition, R$_2$ and R$_3$ may form with the nitrogen atom a heterocyclic radical which may contain another hetero atom such as oxygen, or $$-(CH_2)_n-N\!\!\begin{array}{c}\diagup R_2 \\ \diagdown R_3\end{array}$$

where R$_2$ and R$_3$ are as defined above, and $n$ is 1 or 2; in this case, the compounds are preferably prepared in the form of a salt by reacting an acid or an alkyl halide with the basic form of the compound in accordance with Examples 18 to 29 hereinafter set forth, or $$-(CH_2)_n-\!\!\overset{\displaystyle O}{\underset{\displaystyle \|}{P}}\!\!\begin{array}{c}\diagup OR_4 \\ \diagdown OR_5\end{array}$$

where R$_4$ and R$_5$ represent alkyl radicals containing from 1 to 5 carbon atoms as previously described while $n$ is 1 or 2, or $$-(CH_2)_n-Z-\!\!\overset{\displaystyle (S)\;O}{\underset{\displaystyle \|}{P}}\!\!\begin{array}{c}\diagup OR_4 \\ \diagdown OR_5\end{array}$$

where R$_4$ and R$_5$ represent alkyl radicals containing 1 to 5 carbon atoms as previously described, $n$ is 1 or 2 and Z is oxygen, sulphur or NH.

It will be appreciated that the group R is generally an alkyl radical which may be substituted in various ways.

The invention relates to esters of the type described as new industrial products, to the process for their preparation and to their use as anti-parasitic agents and, in particular, as insecticides, pesticides and fungicides.

The process for preparing the phosphoric esters embodying the features of this invention comprises reacting a halide of the group R with the tetramethylammonium salt of disubstituted derivatives of trithiophosphoric acid and tetrathiophosphoric acids suitable for obtaining the required phosphorus derivative.

The tetramethylammonium salt is obtained by heating a thiomethyldithioalkyl phosphate or thiophosphate with trimethylamine. The reaction is preferably carried out in the presence of a solvent by heating the phosphate or thiophosphate with an excess of trimethylamine for a few hours at a temperature within the range of 70° to 100° C. The tetramethylammonium salt precipitates as it is formed. The course of the reaction is as follows:

$$\begin{array}{c} R'S \\ \phantom{R'S}\diagdown \\ \phantom{R'S}\phantom{\diagdown}\underset{\displaystyle R''S\diagup}{\overset{\displaystyle Y}{\underset{\displaystyle \|}{P}}}-S-CH_3 \end{array} + N(CH_3)_3 \longrightarrow \left[\begin{array}{c} R'S \\ \phantom{R'S}\diagdown \\ \phantom{R'S}\phantom{\diagdown}\underset{\displaystyle R''S\diagup}{\overset{\displaystyle S}{P}}\!\!\diagdown\!\! Y \end{array}\right] N(CH_3)_4$$

The second stage of preparation comprises heating a substantially equimolar mixture of the halide X—R and the tetramethylammonium salt for a few hours to a temperature within the range of 50° and 100° C. in the presence of solvent. The tetramethylammonium halide precipitates while the required phosphoric ester remains in solution.

The general course of the reaction is as follows:

$$\left[\begin{array}{c} R'S \\ \phantom{R'S}\diagdown \\ \phantom{R'S}\phantom{\diagdown}\underset{\displaystyle R''S\diagup}{\overset{\displaystyle S}{P}}\!\!\diagdown\!\! Y \end{array}\right] N(CH_3)_4 + R-X \longrightarrow$$

$$\begin{array}{c} R'S \\ \phantom{R'S}\diagdown \\ \phantom{R'S}\phantom{\diagdown}\underset{\displaystyle R''S\diagup}{\overset{\displaystyle Y}{\underset{\displaystyle \|}{P}}}-S-R \end{array} + XN(CH_3)_4$$

In these formulae, R'', R', Y and R are as defined above. X represents a halogen atom such as chlorine or bromine.

The following table shows by way of illustration, but not by way of limitation, examples of a number of thiophosphorus products prepared by the method heretofore described:

| R'' | R' | Y | R |
|---|---|---|---|
| CH₃ | CH₃ | O | —CH₂—C₆H₄—OCH₃ |
| CH₃ | CH₃ | O | —CH₂—C₆H₄—CN |
| CH₃ | C₂H₅ | O | —CH₂—C₆H₂(Cl)(F)—Cl (with Cl, F) |
| C₂H₅ | C₂H₅ | O | —CH₂—C₆H₄—SC₂H₅ |
| CH₃ | CH₃ | O | —CH₂—C₆H₄—Br |
| CH | CH | S | —CH₂—C₆H₃(Cl)—Cl |
| CH₃ | CH₃ | O | —CH(C₆H₅)—COOC₂H₅ |
| C₂H₅ | C₂H₅ | S | —CH(CH₃)—COOC₂H₅ |
| CH₃ | CH₃ | S | —CH₂—CON(CH₃)₂ |
| C₂H₅ | C₂H₅ | S | CH₂—CH₂—CO—NH—C₆H₅ |
| C₂H₅ | C₂H₅ | S | —CH₂—CH₂—C₆H₃(NO₂)(CH₃) |
| CH₃, OH, CH₃ | CH₃, OH, CH₃ | S | —CH₂—CON(C₄H₉)(CH₃) |

The following examples are given by way of illustration, but not by way of limitation, of the process by which a number of trithio- or tetrathiophosphoric esters are prepared.

The first two examples illustrate the preparation of the tetramethylammonium salts used as starting material for the preparation of the esters to which Examples 2 to 44 relate.

EXAMPLE 1

Tetramethylammonium-S,S-dimethyl-trithiophosphate

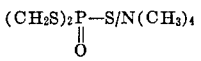

37.6 g. (0.2 mol) of (CH₃S)₃PO (B.P. at 1.1 mm. Hg=105°) and 100 ml. of a 28% by weight solution of trimethylamine in acetone, i.e. approximately 0.37 mol, are introduced into a pressure-resistant reaction flask made of thick glass.

After the flask has been hermetically sealed, it is heated for 8 hours at 95° C. on a water bath. The flask is then allowed to cool, after which 50 ml. of dry ethylether are added to precipitate the formed tetramethylammonium salt. The product is then filtered to isolate the salt which is washed with ether and dried in vacuo over phosphoric anhydride. 42 g. of tetramethylammonium-S,S-dimethyl-trithiophosphate melting at 132° C. are obtained corresponding to a yield of 85%.

Tetramethylammonium - S,S - dimethyl - trithiophosphate is a white, well crystallized and hygroscopic solid which is highly soluble in water, alcohol, soluble in chloroform, acetonitrile, dimethylformamide and acetone, but insoluble in ether and benzene.

EXAMPLE 2

Tetramethylammonium-S,S-dimethyl-tetrathiophosphate

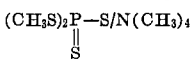

A mixture of 40.8 g. of (CH₃S)₃PS and 100 ml. of a 28% by weight solution of trimethylamine in acetone is heated for 12 hours at 95° C. in a hermetically sealed reaction flask. Further preparation is then as in Example 1. 43.5 g. (corresponding to a yield of 82.5%) of tetramethylammonium - S,S - dimethyl - tetrathiophosphate (M.P.=171° C.) are obtained. After recrystallization from anhydrous ethanol, the product melts at 173° C.

Tetramethylammonium - S,S - dimethyl - tetrathiophosphate is a white, well crystallized and hygroscopic solid which is highly soluble in water, soluble in alcohol and chloroform but insoluble in ether and benzene.

EXAMPLE 3

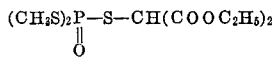

24.7 g. (0.1 mol) of tetramethylammonium - S,S-dimethyl-trithiophosphate are dissolved in 100 ml. of chloroform. 23.9 g. (0.1 mol) of Br—CH(COOC₂H₅)₂ are added to the resulting solution. The reaction vessel is then hermetically sealed and heated for 2 hours at 80° C. on a water bath.

The flask is left to cool, and the tetramethylammonium bromide, quantitatively formed, is filtered off. The filtrate is washed with a solution of n/10 sodium bicarbonate to a slightly alkaline pH, and then washed with water until neutral. The chloroformic solution is then dried over sodium sulphate. The product is filtered, the chloroform removed in vacuo and the product purified by distillation in a nitrogen atmosphere.

26 g. of product are obtained having a B.P.=148–150° C. at 0.01 mm. of mercury. Its refractive index at 20° C. in relation to the line D of sodium is $n_D^{20}=1.5415$.

The compound is a colorless liquid which is soluble in organic solvents but insoluble in water. The yield comprises 81% of the theoretical.

EXAMPLES 4 TO 6

The compounds set out in Table I were prepared as in Example 3 by reacting tetramethylammonium - S,S - dimethyl-trithiophosphate and the associated halogenated derivative BrCH₂COOC₂H₅ (4), BrCH—COOC₂H₅ (5) and BrCH₂—CH₂—COOC₂H₅ (6) in chloroformic medium.

TABLE I

| Example No. | Formula | B.P., °C./mm. Hg | $n_{D20}$ | Yield, percent |
|---|---|---|---|---|
| 4 | (CH₃S)₂P(O)—S—CH₂—COOC₂H₅ | 112–5/0.01 | 1.5705 | 61 |
| 5 | (CH₃S)₂P(O)—S—CH(CH₃)—COOC₂H₅ | 116/0.01 | 1.5564 | 72 |
| 6 | (CH₃S)₂P(O)—S—CH₂—CH₂—COOC₂H₅ | 130–2/0.05 | 1.5577 | 68 |

EXAMPLE 7

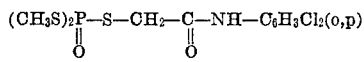

A mixture of 24.7 g. (0.1 mol) of tetramethylammonium-S,S-dimethyl-trithiophosphate, 23.75 g.(0.1 mol) of Cl—CH₂CO-NH-C₆H₃Cl₂ (2.4) and 75 ml. of chloroform, is heated for 5 hours at 90°. Tetramethylammonium chloride begins to precipitate after heating for 15 minutes.

The reaction mixture is left to cool, and is then filtered to eliminate the tetramethylammonium hydrochloride. The filtrate is washed with a solution of sodium bicarbonate until its pH is just alkaline, and then with water. The washing liquor is extracted with chloroform. The chloroformic solutions are recombined, dried over sodium sulphate, filtered, the solvent removed under vacuum and then at 0.01 mm. of mercury for 30 minutes at 50°.

30 g. of a crystallizable viscous residue are obtained. The yield comprises 80%.

After recrystallization from cyclohexane, the product melts at 90° C.

EXAMPLES 8 AND 9

The procedure is the same as that of Example 7 except that the compound Cl—CH₂-CO-NH-C₆H₃Cl₂ is substituted by the compound

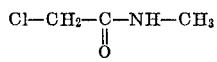

in Example 8 and

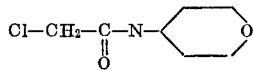

in Example 9, to produce the compounds as set forth in Table II.

TABLE II

| Example No. | Formula | M.P.,° C. | Yield, percent |
|---|---|---|---|
| 8 | (CH₃S)₂P(O)—S—CH₂—C(O)—NH—CH₃ (1) | 80 | 61 |
| 9 | (CH₃S)₂P(O)—S—CH₂—C(O)—N⟨morpholine⟩ | (¹) | 80 |

¹ Colorless oil.

EXAMPLE 10

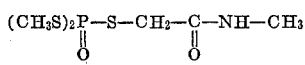

The foregoing compound is produced by the reaction of N-methylchloroacetamide with tetramethylammonium- dimethyltetrathiophosphate under the conditions of Example 7 and yields a viscous, colorless residue which crystallizes in a mixture of carbon tetrachloride and petroleum ether. After recrystallization from petroleum ether, the product, secured in a yield of 80%, melts at 38–39° C.

EXAMPLE 11

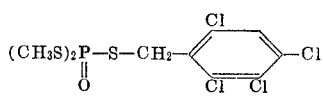

11.5 g.(0.05 mol) of 2,4,5-trichlorobenzyl chloride are reacted for 4 hours at 80° C. with 13 g. (0.0525 mols) of tetramethylammonium - S,S-dimethyltrithiophosphate dissolved in 50 ml. of chloroform. The preparation is then completed, as in Example 7. 16 g. of a solid residue are obtained which melts at 62° C. after recrystallization from petroleum ether. The yield corresponds to 70%.

EXAMPLES 12 TO 17

The procedure is the same as that of Example 11 except that the compound tetramethylammonium-S,S-dimethyltetrathiophosphate is substituted for the compounds tetramethylammonium - S,S - dimethyltrithiophosphate, in Example 12, and the 2,4,5-trichlorobenzyl chloride is substituted by

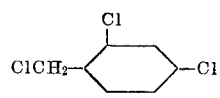

in Example 13;

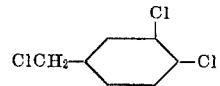

in Example 14;

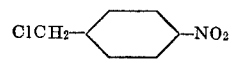

in Example 15;

ClCH₂—CH₂-P(OCH₃)₂ in Example 16 and

ClCH₂—CH₂—O—P(O)(OCH₃)₂ in Example 17.

The compounds that are prepared are shown in the following Table III:

TABLE III

| Example No. | Formula | B.P. in °C/mm. Hg or M.P. | Yield, percent |
|---|---|---|---|
| 12 | (CH$_3$S)$_2$P(=S)—S—CH$_2$—C$_6$H$_2$Cl$_3$ (2,4,5-Cl) | M.P.=55 | 70 |
| 13 | (CH$_3$S)$_2$P(=O)—S—CH$_2$—C$_6$H$_3$Cl$_2$ (2,4-Cl) | | 78 |
| 14 | (CH$_3$S)$_2$P(=O)—S—CH$_2$—C$_6$H$_3$Cl$_2$ (2,5-Cl) | B.P.=179/0.05 slight decomp | 30 |
| 15 | (CH$_3$S)$_2$P(=O)—S—CH$_2$—C$_6$H$_4$—NO$_2$ | | 90 |
| 16 | (CH$_3$S)$_2$P(=O)—S—CH$_2$—CH$_2$—P(=O)(OCH$_3$)$_2$ | B.P.=177/0.02 | 52.5 |
| 17 | (CH$_3$S)$_2$P(=O)—S—CH$_2$CH$_2$—O—P(=O)(OCH$_3$)$_2$ | | 84 |

EXAMPLE 18

(CH$_3$S)$_2$P(=O)—S—CH$_2$CH$_2$—N(C$_2$H$_5$)$_2$

A mixture of 24.7 g. (0.1 mol) of tetramethylammonium-S,S-dimethyltrithiophosphate, 14.8 g. (0.11 mol) of freshly prepared ClCH$_2$CH$_2$N(C$_2$H$_5$)$_2$ and 50 ml. of chloroform, is stirred for 6 hours at room temperature. The tetramethylammonium chloride is eliminated by filtration. The chloroform is removed in a vacuum formed by water jet and then at 0.01 mm. of mercury for 30 minutes at 40°.

The residue is taken up in 100 ml. of anhydrous ether in order to precipitate all the tetramethylammonium salt soluble in the chloroformic solution. The product is filtered and the ether removed in vacuo. 23 g. of a colorless residue are obtained of the product, corresponding to a yield of 84.2%.

EXAMPLES 19 to 21

The procedure of Example 18 was followed except that the tetramethylammonium - S,S-dimethyltrithiophosphate is replaced by the corresponding tetramethylammonium-S,S-dimethyltetrathiophosphate in Example 19 and the ClCH$_2$CH$_2$N(C$_2$H$_5$)$_2$ is replaced with

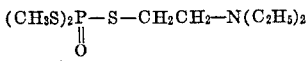

in Example 20 and by

ClCH$_2$CH$_2$N(morpholinyl)

in Example 21. The following are the compounds produced:

| Example No. | Formula | Yield, percent |
|---|---|---|
| 19 | (CH$_3$S)$_2$P(=S)SCH$_2$CH$_2$N(C$_2$H$_5$)$_2$ | 85 |
| 20 | (CH$_3$S)$_2$P(=O)SCH$_2$CH$_2$N(morpholino-O) 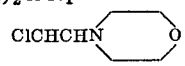 | 73.2 |
| 21 | (CH$_3$S)$_2$P(=O)SCH$_2$CH$_2$N(morpholino) 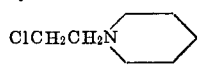 | 86.6 |

EXAMPLE 22

(CH$_3$S)$_2$P(=O)—S—CH$_2$CH$_2$—N$^+$(C$_2$H$_5$)$_2$(H)·COO$^-$COOH

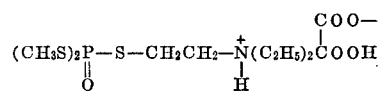

A solution of 5 g. of (COOH)$_2$·2H$_2$O in 30 ml. of acetone is added dropwise with stirring to a solution of 11.5 g. of S,S-dimethyl-S-(2-diethylaminoethyl)-trithiophosphate in 25 ml. of acetone, until the resulting mixture gives a pH of 4 with water.

Stirring is continued for 15 minutes, after which the salt formed is filtered and washed three times with 20 ml. of anhydrous acetone. The product is then dried in vacuo over P$_2$O$_5$. 13.4 g. of product melting at 123–124° are obtained. After recrystallization from acetonitrile, its melting point is 124°. The yield corresponds to 87.5%.

EXAMPLES 23 to 25

The procedure is the same as that of Example 22 except that the corresponding tetrathiophosphate is substituted for the trithiophosphate in Example 23 and in which in the trithiophosphate the

N(C$_2$H$_5$)$_2$—H group is substituted by a

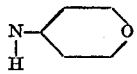

group in Example 24 and a

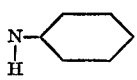

group in Example 25. The following are the compounds produced:

| Example No: | Formula | M.P. | Yield, percent |
|---|---|---|---|
| 23 | $(CH_3S)_2\underset{\underset{S}{\|}}{P}SCH_2CH_2\overset{+}{N}(C_2H_5)_2 \cdot \underset{H}{\|} / \underset{COOH}{COO^-}$ | 118 | 87 |
| 24 | $(CH_3S)_2\underset{\underset{O}{\|}}{P}SCH_2CH_2\overset{+}{N}\underset{H}{\diagdown}O / \underset{COOH}{COO^-}$ | 168 | 90 |
| 25 | $(CH_3S)_2\underset{\underset{O}{\|}}{P}SCH_2CH_2\overset{+}{N}\underset{H}{\diagdown} / \underset{COOH}{COO^-}$ | 164 | 91 |

EXAMPLE 26

$(CH_3S)_2\underset{\underset{O}{\|}}{P}-S-CH_2CH_2-\overset{+}{N}(C_2H_5)_2 \cdot Br^-$
$\hspace{5em} \underset{CH_3}{\|}$ 11.5 g. of S,S - dimethyl-S-(2-diethylaminoethyl)-trithiophosphate in 10 ml. of acetone are treated with 25 ml. ml. of a 40% by weight solution of methyl bromide in acetone. The salt begins to precipitate after a few minutes at room temperature. The reaction mixture is left standing for 3 days at room temperature, after which the product is isolated by filtration, washed with acetone, dried in vacuo over $P_2O_5$.

12.7 g. of a product are obtained which melts at 112° after recrystallization from a mixture of 15% of iso-$C_3H_7OH$ and 85% of acetone. The yield corresponds to 82%.

EXAMPLES 27 to 29

The procedure is the same as in Example 26 except that the corresponding tetrathiophosphate is substituted for the trithiophosphate in Example 27, and in the trithiophosphate of Example 26, the group is substituted by the group

in Example 28 and

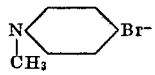

in Example 29. The following are the compounds produced:

| Example No: | Formula | M.P. | Yield, percent |
|---|---|---|---|
| 27 | $(CH_3S)_2\underset{\underset{S}{\|}}{P}SCH_2CH_2\overset{+}{N}(C_2H_5)_2 \; Br^-$ $\hspace{6em}\underset{CH_3}{\|}$ | 113 | 85 |
| 28 | $(CH_3S)_2\underset{\underset{O}{\|}}{P}SCH_2CH_2\overset{+}{N}\diagdown O \; Br^-$ $\hspace{6em}\underset{CH_3}{\|}$ | 122-5 | 88 |
| 29 | $(CH_3S)_2\underset{\underset{O}{\|}}{P}SCH_2CH_2\overset{+}{N}\diagdown \; Br^-$ $\hspace{6em}\underset{CH_3}{\|}$ | 144-7 | 84 |

Other salts may be prepared by a similar process, particularly the halides, alkyl halides (containing 1 to 5 carbon atoms) and the salts of aliphatic, saturated or unsaturated mono- or di-acids containing 2 to 20 carbon atoms.

EXAMPLES 30 TO 36

Following the procedure of Example 11, the following compounds are prepared by reacting equimolar quantities of tetramethylammonium-S,S-dimethyltrithiophosphate with the following substituted derivatives of benzyl chloride:

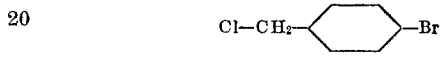

in Example 30;

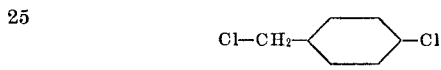

in Example 31;

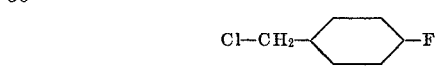

in Example 32;

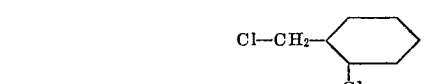

in Example 33;

in Example 34;

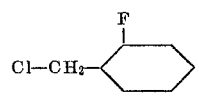

in Example 35;

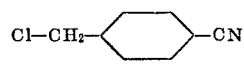

in Example 36;

| Example | Formula | B.P., C./mm. Hg or M.P. | Yield | Remarks |
|---|---|---|---|---|
| 30 | $(CH_3S)_2\underset{\underset{O}{\|}}{P}-S-CH_2-\text{C}_6\text{H}_4-Br$ | 170/5.10$^{-2}$ | 64 | |
| 31 | $(CH_3S)_2\underset{\underset{O}{\|}}{P}-S-CH_2-\text{C}_6\text{H}_4-Cl$ | 188/10$^{-1}$ | 56 | |
| 32 | $(CH_3S)_2\underset{\underset{O}{\|}}{P}-S-CH_2-\text{C}_6\text{H}_4-F$ | 139/5.10$^{-2}$ | 75 | |
| 33 | $(CH_3S)_2\underset{\underset{O}{\|}}{P}-S-CH_2-\text{C}_6\text{H}_4(Cl)$ | 145/5.10$^{-2}$ | 70 | |
| 34 | $(CH_3S)_2\underset{\underset{O}{\|}}{P}-S-CH_2-\text{C}_6\text{H}_4(F)$ | 138/5.10$^{-2}$ | 50 | |
| 35 | $(CH_3S)_2\underset{\underset{O}{\|}}{P}-S-CH_2-\text{C}_6\text{H}_3(F)(I)$ | 157/10$^{-2}$ | 64 | |
| 36 | $(CH_3S)_2\underset{\underset{O}{\|}}{P}-S-CH_2-\text{C}_6\text{H}_4-CN$ | M.P.=65 | 71.5 | (¹) |

¹ Recrystallizable from cyclohexane.

EXAMPLES 37 TO 39

The following compounds are obtained by a procedure similar to Examples 30 to 36 in which tetramethylammonium-S,S-dimethyltetrathiophosphate is substituted for the tetramethylammonium - S,S - dimethyltrithiophosphate in Examples 30 and 34 and in which

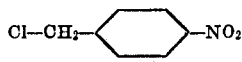

is also substituted for the compound

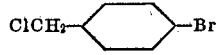

in Example 30.

| Ex. | Formula | B.p., °C./ mm. Hg or M.P. | Yield | Remarks |
|---|---|---|---|---|
| 37 | $(CH_3S)_2\underset{\underset{S}{\|}}{P}-S-CH_2-\text{C}_6\text{H}_4-Br$ | ---------- | 95 | (¹) |
| 38 | $(CH_3S)_2\underset{\underset{S}{\|}}{P}-S-CH_2-\text{C}_6\text{H}_4(F)$ | 143/5.10$^{-2}$ | 54 | |
| 39 | $(CH_3S)_2\underset{\underset{S}{\|}}{P}-S-CH_2-\text{C}_6\text{H}_4-NO_2$ | ---------- | 73.5 | (²) |

¹ Colorless oil, non-distillable.
² Non-distillable yellow oil.

EXAMPLES 40, 41 AND 42

The following compounds were prepared by reacting

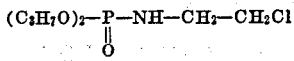

in Example 40; $(C_3H_7O)_2-P-NH-CH_2-CH_2-Cl$ in Example 41, and $(CH_3O)_2-P-CH_2-CH_2-Cl$ in Example 42 with tetramethylammonium-S,S-dimethyltrithiophosphate or with tetramethylammonium-S,S-dimethyltetrathiophosphate under the conditions comparable to those of Example 18.

| Example | Formula | Yield | Remarks |
|---|---|---|---|
| 40 | $(CH_3S)_2\underset{\underset{O}{\|}}{P}-S-(CH_2)_2-NH-P\overset{OC_3H_7 \text{ (iso)}}{\underset{OC_3H_7 \text{ (iso)}}{<}}$ | 66 | (¹) |
| 41 | $(CH_3S)_2\underset{\underset{S}{\|}}{P}-S-(CH_2)_2-NH-P\overset{OC_3H_7 \text{ (iso)}}{\underset{OC_3H_7 \text{ (iso)}}{<}}$ | 85 | (¹) |
| 42 | $(CH_3S)_2\underset{\underset{S}{\|}}{P}-S-(CH_2)_2-P\overset{OCH_3}{\underset{OCH_3}{<}}$ | 76 | (¹) |

¹ Non-distillable, colorless oil.

EXAMPLE 43

The compound

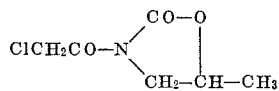

was reacted with tetramethylammonium-S,S-dimethyltrithiophosphate under conditions similar to those of Example 7. The following compound is obtained in a yield of 75%;

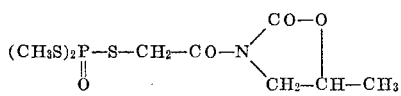

M.P.=50° C.

EXAMPLE 44

The following disymmetrical compound was prepared:

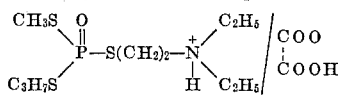

(a) S,S-dimethyl-S'-isopropyl-trithiophosphate was prepared by condensing tetramethylammonium-S,S-dimethyltrithiophosphate with isopropyl bromide in an acetone medium for 11 hours at 80°. The resulting product which corresponds to the formula

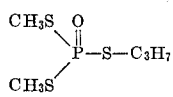

is a liquid which boils at 102.5°/0.1 mm. of mercury.

(b) The tetramethylammonium salt of this asymmetrical phosphate was then prepared by reacting it for 23 hours at 80° with trimethylamine. A solid corresponding to the following formula was obtained:

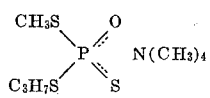

M.P.=263°; yield=60%.

(c) The compounds (basic form) was then prepared in accordance with the procedure of Example 18. The reaction which takes place in acetonitrile lasts for 4 hours at 80°. The yield corresponds to 66%.

(d) The oxalate of the product obtained according to (c) was prepared by the process described in Example 22. The product which is precipitated by the addition of methylethylketone is a solid which melts at 103° C. The yield comprises 83%.

In the foregoing examples the formulation set forth at the top represents the identification of the compound prepared and which is present in the resulting product.

EXAMPLES OF THE ANTI-PARASITIC ACTIVITY OF THE COMPOUNDS ACCORDING TO THE INVENTION

The following examples show the results of tests conducted to determine the biological activity of the thiophosporus derivatives of this invention:

(I) Insecticidal tests (a) *Tests on calandrae.*—0.5 cc. of an acetone solution containing 10 g./l. of active material are introduced onto the bottom of a Petri dish. After the acetone has been allowed to evaporate, 100 weevils are placed in the dish. At the end of 10 days, the number of living and dead weevils is counted.

Under these conditions, the products of Examples 3, 4, 5, 6, 11, 12, 13, 15, 21, 24, 30, 31, 32, 33, 34, 35, 37, 38, 41, 42 produce a 100% mortality rate.

(b) *Tests on flies.*—Flies are placed in a Petri dish with a gauze cover. 5 cc. of a 2 g./l. of active material in acetone are sprayed onto the dish. At the end of 2 hours, the number of living and dead flies is counted.

Under these conditions, the products of Examples 4, 5, 11, 25 and 42 produce a mortality rate of 100%, while the product of Example 6 produces a mortality rate of 80%.

(c) *Tests on caterpillars.*—Flour impregnated with 0.05% by weight of active material is introduced into a test tube. Some eggs of the Ephestia are placed on the flour and, at the end of 15 days, the tubes are examined to determine in which of them the eggs have hatched into larvae.

Under these conditions, the products of Examples 4, 5, 10, 11, 15, 23, 25, 30, 31, 32, 33, 34, 35, 36, 38 and 42 kill off all the young caterpillars.

(II) Pesticidal tests

Rings are cut from haricot leaves carrying a population of *Tetranychus urticae*, and are then treated by spraying with a solution containing 0.1 g./l. of active material. After 48 hours, the number of living and dead Acaridae is counted.

Under these conditions, the products of Examples 3, 4, 5, 9, 10, 11, 12, 15, 17, 18, 21, 25, 29, 30, 31, 32, 33, 34, 35, 36, 37, 38, 41 and 42 produce a 100% Acaridae mortality rate. The products of Examples 11, 12, 21, 30, 33 and 38 kill between 70% and 90% of the Acaridae in a dosage containing ¹⁄₁₀ the above concentration.

(III) Fungicidal tests

An aqueous spray prepared from a wettable powder containing 20% of active material diluted to the required concentration was used for the following applications.

The spray was then applied to the plants to be treated which were then artificially contaminated with spores of a selected fungus. The time required to inhibit growth of the parasite was measured.

(a) Corn plants are treated with a spray containing 2 g./l. of active material. The plants were then contaminated with spores of *Erysiphe graminis* (responsible for the blight affecting corn). At the end of 8 days, the extent to which growth of the fungus had been inhibited was measured, the results being set out in the following table:

| Product of Example No. | Inhibition, percent | Product of Example No. | Inhibition, percent |
|---|---|---|---|
| 5 | 80 | 32 | 100 |
| 6 | 100 | 33 | 100 |
| 10 | 100 | 35 | 80 |
| 13 | 100 | 37 | 80 |
| 23 | 80 | 38 | 100 |
| Untreated sample | 0 | | |

Products 32 and 33 inhibit the growth of *Erysiphe graminis* in a dose two times weaker.

(b) Haricot plants are treated with a spray containing 1 g./l. of active material. The plants are then contaminated with spores of *Uromyces appendiculatus* (responsible for the blight affecting haricots). At the end of 8 days, the extent to which the growth of the fungus had been inhibited was measured, the results being set out in the following table:

| Product of Example No. | Inhibition, percent | Product of Example No. | Inhibition, percent |
|---|---|---|---|
| 5 | 80 | 32 | 80 |
| 10 | 80 | 37 | 80 |
| 28 | 100 | 16 | 80 |
| Untreated sample | 0 | | |

(c) Certain compounds such as, for example, those of Example 15, also show, on parasitic wood fungi (*Coriolus versi-color, Chaetomium globosum* and *Coniophora cerebella*), an activity equivalent to that of pentachlorophenol which is the conventional product employed to control these species of parasite.

The preceding examples illustrate the remarkable versatility of the compounds of this invention. In addition, their toxicity, in respect of warm-blooded animals, is in general low. When administered intraperitoneally to mice in mg./kg., the $DL_{50}$ is rarely less than 100 and, more often, of the order of several hundreds. Finally, these compounds show a complete absence of phytotoxicity on plants. The combination of properties renders the compounds of this invention particularly suitable for use in controlling parasites affecting crops and buildings.

For their application in parasite control, the products are generally used in the form of compositions which, in addition to the active material, contain a generally inert diluent vehicle and, if desired, one or more additives.

For example, the compositions according to the invention can be used in the form of powders for dusting, wettable powders, emulsifiable concentrates, aqueous dispersions, solutions, etc.

In the case of powders, as examples of the inert vehicle use can be made of pyrophyllite, diatomite, talcum, clays, etc. In order to obtain a wettable powder, a surface-active agent of any anionic, cationic or non-ionic type is added, such as represented by the following formulae of anion compounds:

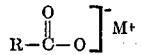

or

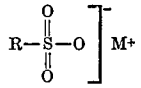

or

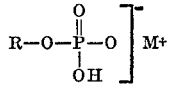

or cationic compounds:

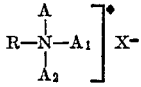

or nonionic compounds:

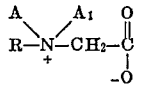

wherein R represents a lipophile group such as long chain alkyl polycyclic, aryl alkyl and derivatives thereof, $M^+$ represents a positive ion such as $Na^+$ $K^+$ $NH_4^+$, X represents a negative ion such as $Cl^-$ $Br^-$ $I^-$ or other monovalent ion or ½ of a bivalent ion and A, $A_1$, $A_2$ represents H, alkyl, aryl or heterocyclic groups or residues.

In addition, it can be of advantage to add wetting agents, dispersants or adhesives of the kind normally encountered in this type of application, to the composition, depending upon the type of treatment to be carried out and, in particular, upon the nature of the plants capable of being treated.

It will be understood that changes may be made in the details of formulation and preparation without departing from the spirit of the invention, especially as defined in the following claims.

We claim:
1. A process for preparing trithio- and tetrathiophosphoric esters comprising reacting a compound of the formula R—X wherein R is a monovalent organic radical and X is a halogen, with the tetramethylammonium salt of disubstituted derivatives of trithio-phosphoric acid or tetrathiophosphoric acid in substantially equimolecular proportions in the presence of a solvent.
2. The process as claimed in claim 1 in which the reaction is carried out at a temperature within the range of 50–100° C.
3. The process as claimed in claim 1 in which the reaction is carried out for a few hours.

References Cited
FOREIGN PATENTS
1,356,907  2/1964  France.

ALEX MAZEL, Primary Examiner

J. TOVAR, Assistant Examiner

U.S. Cl. X.R.

260—293.4, 307, 925, 926, 928, 931, 940, 941, 942, 943, 945, 949, 954, 964; 424—199, 200, 205, 210, 211, 212

UNITED STATES PATENT OFFICE
CERTIFICATE OF CORRECTION

Patent No. 3,518,261                      June 30, 1970

Thanh-Thuong Nguyen et al.

It is certified that error appears in the above identified patent and that said Letters Patent are hereby corrected as shown below:

Column 1, line 65, cancel the formula. Column 6, line 10, cancel the chlorine on the $C_6$ position of the benzene molecule; line 27, "compounds" should read -- compound --. Column 7, Example 14, "$(CH_2S)_2$" should read -- $(CH_3S)_2$ --.

Signed and sealed this 16th day of February 1971.

(SEAL)
Attest:

Edward M. Fletcher, Jr.                  WILLIAM E. SCHUYLER, JR.
Attesting Officer                         Commissioner of Patents